Figure 9:
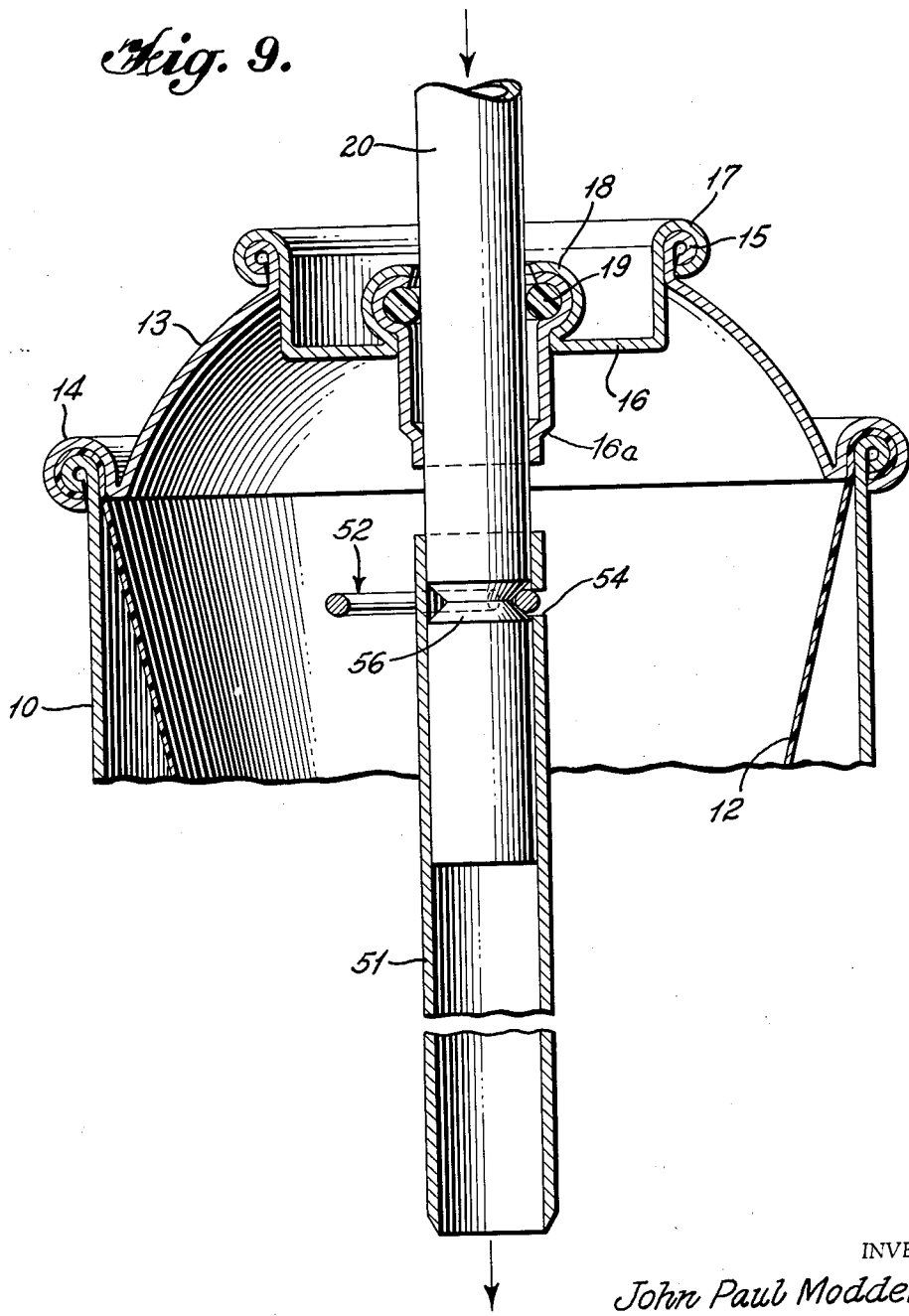

March 5, 1963 J. P. MODDERNO 3,080,094
COMPARTMENTED PRESSURIZED CONTAINER VALVE
ASSEMBLY AND A CUTTER THEREFOR
Filed April 29, 1958 3 Sheets-Sheet 1
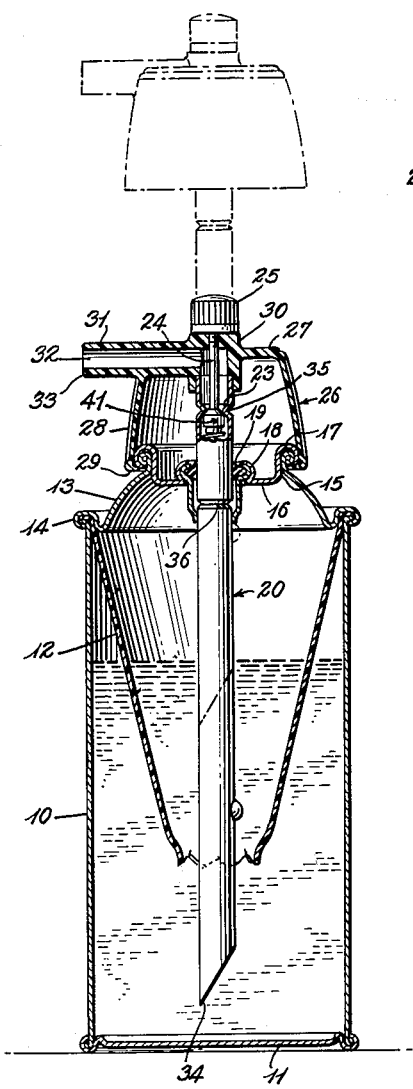
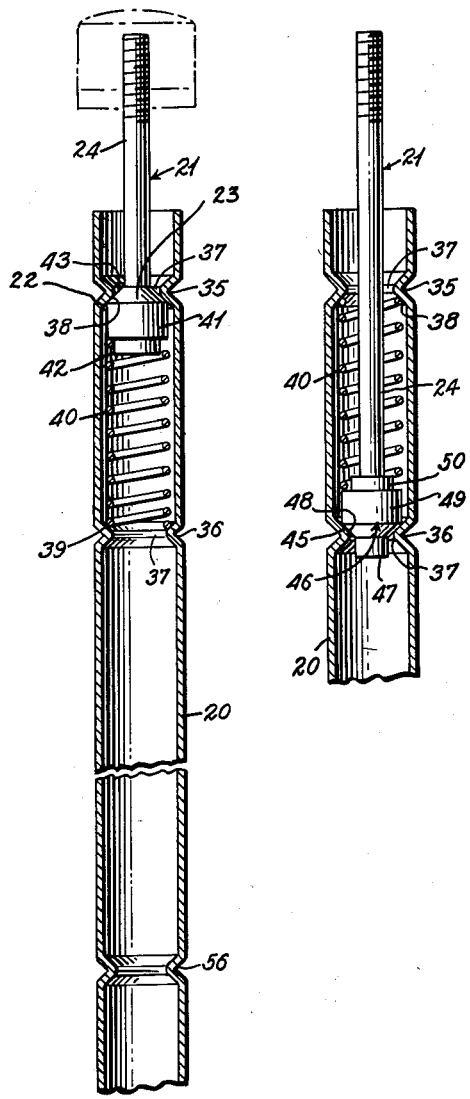
INVENTOR
John Paul Modderno
BY *Stevens, Davis, Miller & Mosher*
ATTORNEYS March 5, 1963   J. P. MODDERNO   3,080,094
COMPARTMENTED PRESSURIZED CONTAINER VALVE
ASSEMBLY AND A CUTTER THEREFOR
Filed April 29, 1958   3 Sheets-Sheet 2
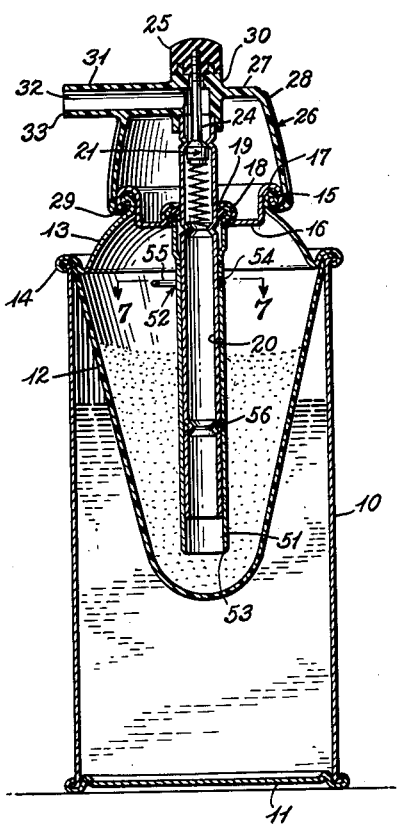
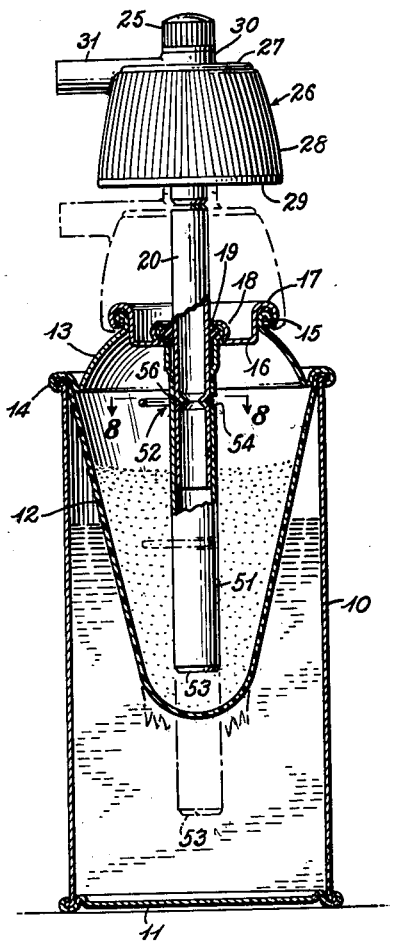
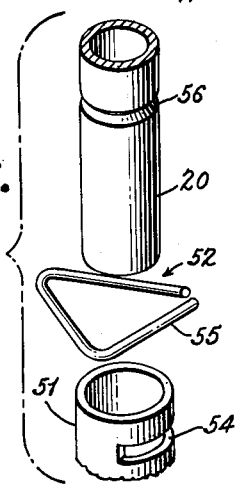
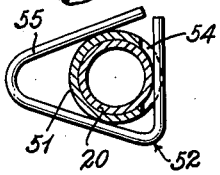
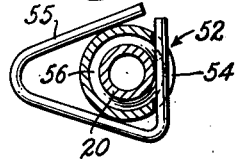
INVENTOR
John Paul Modderno
BY *Stevens, Davis, Miller & Mosher*
ATTORNEYS March 5, 1963   J. P. MODDERNO   3,080,094
COMPARTMENTED PRESSURIZED CONTAINER VALVE
ASSEMBLY AND A CUTTER THEREFOR
Filed April 29, 1958   3 Sheets-Sheet 3

INVENTOR
John Paul Modderno

BY Stevens, Davis, Miller & Mosher
ATTORNEYS

United States Patent Office 3,080,094
Patented Mar. 5, 1963

3,080,094
COMPARTMENTED PRESSURIZED CONTAINER VALVE ASSEMBLY AND A CUTTER THEREFOR
John Paul Modderno, Gambrills, Md., assignor to Modern-Lab, Incorporated, Baltimore, Md., a corporation of Maryland
Filed Apr. 29, 1958, Ser. No. 731,696
3 Claims. (Cl. 222—82)

This invention relates to a valve device for pressurized dispensing. More particularly, the invention relates to a valve mechanism having a valve seat formed from a portion of the wall of a discharge tube of a pressurized dispenser and to the utilization of the wall of the tube to provide a simplified valve construction having a minimum of assembled parts.

With the advanced development of pressurized dispensing containers, a need has arisen for a simplified and economical valve mechanism for effecting instantaneous release of the product in the container, which will withstand the pressure in the container without permitting leakage of the propellant gas. This need is particularly evident in those pressurized containers in which the valve mechanism is in the upper portion of the discharge tube. In order to effect instant release of the pressurized material in this type of construction, accurately machined, small valve parts are required, which must be assembled in the discharge tube in a compact arrangement, requiring delicate handling and operation.

This invention eliminates the need for an assembly of precision valve parts by providing a simple and economical valve construction, which responds instantaneously to produce a positive seating and unseating. A minimum number of assembled parts are used by forming the wall of the discharge tube so as to provide means for effecting valve closure. The wall of the upper portion of the discharge tube is formed by rolling, pressing, molding, or the like, so as to press in and contour a portion of the wall of the discharge tube to provide a circular protruding valve seat adapted to receive in sealing engagement the seating surface of a spring-biased valve stem. The pressed-in wall of the tube may be in the form of a V-shaped groove arranged substantially perpendicular to the vertical axis of the tube to provide a protruding continuous ring-like surface accurately contoured to form the valve seat.

The wall of the tubing at a spaced distance from the protruding valve seat may have a second pressed-in protrusion formed therein, such as a V-shaped ring or other type of indentation. When the valve seat and the second spaced indentation are formed in the wall of the tube, a valve stem with a spring biasing means can be positioned therebetween with the spring urging the seating surface of the valve stem against the seating surface of the valve by the anchoring of one end of the spring-biasing means against the indentations. In this construction, the valve stem extends out the discharge end of the tube so that actuation thereof unseats the valve by biasing the spring to provide an opening in the tube through which the material under pressure is discharged.

The valve device of this invention is particularly adaptable to plunger type discharge tubes used in pressurized containers having two or more compartments separated by a rupturable wall to retain the ingredient of each compartment separate until use is desired. When the discharge tube is depressed, if effects rupture of the wall separating compartments and places the container in condition for use. This type of container is described and shown in my co-pending application for Letters Patent, Ser. No. 614,014, filed October 4, 1956, now abandoned. In this type of dispensing device, the discharge head must be light, compact and of a simplified construction since it is attached to the discharge end of the tube. In addition, if a pressurized container employs a telescoping type of discharge tube, such as is described and shown in my co-pending application for Letters Patent, Ser. No. 650,140, filed April 2, 1957, now abandoned, in which the inner telescoping tube has a groove for locking the telescoping tubes in extended position, the valve seat biasing spring, anchoring indentation and the telescoping locking groove may be rolled or pressed in the discharge tube in one production set-up with intermediate assembly of the spring and valve stem before the last groove is formed. Thus, a simplified and economical assembly is provided with a minimum of assembled parts.

These and other objects of the invention will become apparent from an examination of the drawings, specification, and appended claims.

The invention will be described further in connection with the accompanying drawings which are to be considered by way of exemplification and not by way of limitation.

In the drawings,

FIGURE 1 is a cross-sectional view in elevation showing a pressurized container with the valve seat formed from a portion of the inside surface of the discharge tube, FIGURE 2 is a cross-sectional view in elevation showing the valve device with the inner wall of the discharge tube formed to provide the valve seat adjacent to the discharge end thereof and indentation of the wall of the tube below the valve seat for maintaining an urging spring against the valve stem, FIGURE 3 is a cross-sectional view in elevation of an alternate valve device showing the valve seat positioned below the indentation, FIGURE 4 is a cross-sectional view in elevation showing a compartmentalized container with telescoping rupturing tubes in a retracted position, FIGURE 5 is a cross-sectional view in elevation showing the telescoping rupturing tubes in FIGURE 4 in extended position, FIGURE 6 is a fragmentary view of the telescoping locking device for locking the tubes in extended position, FIGURE 7 is a cross-sectional view on line 7—7 of FIGURE 4 showing the telescoping tube locking device in an unlocked position, FIGURE 8 is a cross-sectional view taken on line 8—8 of FIGURE 5 showing the locking device in locked position, and FIGURE 9 is an enlarged view of a portion of the container shown in FIGURES 4 and 5 illustrating the position of the upper end of the outer telescoping tube with respect to the dependent portion of the circular flange when the spring clip is engaged and the inner telescoping tube is partly depressed, and the inner telescoping tube extending through the annular gasket positioned in the circular flange.

Referring now to the drawings, FIGURE 1 shows a typical pressurized dispensing device of the present invention. The device consists of an open-top main container 10 having a bottom portion 11. Disposed within the container 10 is a downwardly depending sac 12 made of a pliant film so arranged that the upper sides thereof fit over the edge of the top rim of container 10. A cup-shaped cover 13 is fitted into the open top of container 10 and is clinched by rolling to form a flange 14 to provide an hermetic seal between the cover 13 and the container 10. The crimping of the cup-shaped cover 13 divides the container into two separate compartments sealed from each other by the pliant film. The top portion of the cover 13 defines a central aperture, the periphery of which is a boundary in the form of a rolled flange or bead 15. Seated in the aperture is an annular insert 16 having a rolled flange 17 which embraces the bead 15 to form an hermetic seal at this point. The annular insert 16 is so formed as to provide an inner circular flange 18 adapted to receive and retain an annular gasket 19 centrally located with respect to the vertical axis of the container.

Slidably positioned in annular gasket 19 is a discharge tube 20 which extends from above the bottom of the sac 12, through the gasket and above the top of the container. In the top of the tube 20 is a valve unit 21 comprising a valve seat 22 against which a valve stem seat 23 rests when the valve is closed. Extending upward from the valve stem seat is a valve stem shaft 24 which extends out of the end of the discharge tube 20, the end of the shaft threadedly engaging a valve actuating cap 25. Attached to the valve end of the tube 20 is a dispensing head 26 composed of a centrally positioned rounded portion 27 and a depending skirt 28 with an inwardly curled lip 29. On the top of the dispensing member 26 and centrally located therewith is an annular boss 30 defining an opening through which the valve stem shaft 24 extends (see FIGURE 1).

Integral with the central rounded portion 27 and the dependent skirt portion 28 is an elongated spout or nozzle portion 31 defining a central bore 32. The free end of the spout portion 31 defines a discharge orifice or opening in its outer wall as indicated by 33. The inner end of the central bore 32 communicates with the top of the discharge tube 20 above the valve seat so that a passageway is provided, when the valve is unseated, from the container through the tube and out through the bore 32.

The bottom edge of the dependent skirt with its curled lip 29 snaps into locking engagement with the rolled portion of the annular insert 16 when the head is pressed downward. The broken line in FIGURE 1 shows the dispensing member 26 in elevated position before it has been slidably depressed. The discharge tube 20 has a sharp free end 34 for rupturing the sac 12 when the discharge head is depressed.

In the upper end of the tube 20 are two spaced circular grooves or indentations 35 and 36 laterally disposed to the axis of the tube. These grooves may be pressed, rolled or otherwise formed so that the wall of the tubing at this point is pressed inwardly to provide on the inside of the tube a protrusion having reverse shape and proportions as the groove, which may be in the form of intersecting reversed regular truncated cones meeting at the line of their least diameter to define a restricted opening 37. The lower portion of the protrusion formed by the top groove 35 provides a valve seat surface 38. The top portion 39 of the protrusion formed from the lower groove 36 provides a surface for anchoring one end of a valve stem biasing spring 40 positioned between the top and bottom protrusion in the tube.

Operatively positioned in the tube 20 between the valve seat 38 and the anchoring surface 39 is a valve stem seating means in the form of a seat 23. The valve stem seating means has a body section 41 having a downwardly extending circular boss 42 which is adapted to extend into the cylindrical opening the top portion of spring 40 to help maintain the spring centralized with respect to the axis of the discharge tube. The upper end of the body section 41 is in the form of a truncated cone to provide a mating valve seating surface 43 with the valve seat surface 38 and adapted to fit in sealing engagement with the valve seat 38 (see FIGURE 2).

Centrally positioned in the top of the body section 41 and extending upwardly therefrom is a valve stem shaft 24 which extends outwardly from the tube and into and through the annular boss 30 in the dispensing member 26 to which is threadedly engaged cap 25. Downward pressure on the valve stem shaft disengages the seating surface 43 from the valve seat 38 and compresses the spring 40 storing therein potential energy. Release of the downward pressure on the valve stem allows the potential energy stored in the spring 40 to become kinetic and force the valve seating surface 43 against the valve seat 38 to effect a closing of the valve.

An alternate valve arrangement is shown in FIGURE 3 in which the valve seat is formed from the upper surface 45 of the inner wall of the tube. A valve stem seat 23 is positioned between grooves 35 and 36 with a body portion 46. Extending downwardly and through the restricted opening 37 is a circular boss 47 of sufficient length to maintain the valve stem centralized in the tube where it is actuated as heretofore described. Extending upwardly from the boss 47 is a conical valve seating surface 48 adapted to fit in sealing engagement against valve seat 38. At the top of the valve seating surface 48 is an upwardly extending circular body portion 49 terminating in a boss 50, circular in cross-section to receive in fitting relationship the bottom end of the spring 40. Extending upwardly from the boss 50 and centrally located with the axis of the tubes is a valve stem 24 which passes centrally through the opening in spring 40 and the restricted opening 37 formed by groove 35 and then out the end of the tube. A portion of the outer end of the valve stem 24 passes through cap 26 as heretofore described and has threadedly attached thereto an actuating means. The valve is opened by producing an upward pull on the valve stem to compress spring 40 and unseat the valve seating surface 48 from contact with valve seat 38. Release of the upward pull on the valve stem causes the energy built up in the spring to release and seat the valve.

An alternate dispensing arrangement is shown in FIGURES 4 and 5 in which an open top container 10 has a bottom portion 11. Disposed in container 10 is a downwardly depending sac 12 made of pliant film or similar type of rupturable material arranged so that the marginal edge of the sac fits over the edges of the top rim of container 10. A cup-shaped cover 13 fits onto the peripheral opening of the top of container 10 and, by clinching or rolling, is formed a flange 14 hermetically sealing the edge of the sac 12 between the edge of the cover and the rim of the container. This clinching provides for an hermetically sealed container with each compartment sealed from the other.

The cover 13 defines a central aperture therein having a rolled bead 15. Seated in the aperture is an annular insert 16 having a rolled flange 17 which embraces the bead 15 to form an hermetic seal at this point. As heretofore described, an annular insert 16 is provided having a circular flange 18 adapted to receive and retain an annular sealing gasket 19 centrally disposed with respect to the vertical axis of the container.

Slidably disposed in the annular opening of gasket 19 is discharge tube 20. The tube has positioned therein a valve unit 21 with an upwardly extending valve stem shaft 24. Attached to the valve end of the tube is the dispensing head 26 having a rounded portion 27 and a depending skirt 28 with an inwardly curled lip 29. On the top of the dispensing member 26 is a centrally located boss 30 defining an opening through which the valve stem shaft 24 extends. As heretofore described, an elongated spout or nozzle 31 with a central bore 32 therein communicates with the top of tube 20.

The discharge tube is shorter than the tube shown in FIGURE 1 and heretofore described, and when it is in its lowest position in the container, as shown in FIGURE 4, the bottom end rests just above the bottom of the sac 12. A second tube 51 is positioned over tube 20 to form a telescoping arrangement so that tube 20 will slide therein when the dispensing head 26 to which the tube 20 is attached is raised. Telescoping tube 51 is retained in a fixed position on tube 20 by a spring locking arrangement 52 which exerts a constant spring pressure against the inner tube 20 to hold it in a fixed position until the tubes are forcibly elongated by sliding one over the other. The depending end of tube 51 is cut on a bias to provide a sharp piercing end 53. The piercing end resides above the bottom of the pliable sac 12 when the tubes 20 and 51 are in fully telescoped relationship. Located in tube 51 near the top end thereof is a slot 54. Disposed around tube 51 is a spring clip 55 with one or more of its sides positioned in slot 54 and resting against the outer surface of tube 51. The pressure of the spring in the slot 54 against the surface of tube 20 keeps the two tubes in a slidable but fixed relationship. In the bottom portion of tube 20 is a circular indentation 56 which may be formed by rolling a pressed-in groove therein as heretofore described. When the dispensing head 26 is raised, either by hand or by the pressure within the container, tube 20 is forced upward sliding through the annular gasket 19 with the top end of tube 51 butting with the tubular extension 16a of annular member 16, and the spring clip slidably resisting the telescoping extension of the tubes 20 and 51. When tube 20 has been extended above the top of the container the required distance for extension, the spring clip 55 engages groove 56 to lock the tubes in the extended position.

Depressing the discharge head slides tube 20 through annular gasket 19 into the container with the end of tube 20 carrying the locked-on tube 51 so that the sharp end 53 moves downwardly against the bottom of sac 12 rupturing the wall between compartments to effect mixing of the ingredients in the container. Discharge of the pressurized material is accomplished by first unscrewing the cap and then pressing downwardly to actuate the valve stem attached thereto which causes an unseating of the valve seating surface from valve seat and a compression of the spring 40. Release of the downward pressure on cap 25 allows the compression spring to force the valve into seating engagement, thereby instantaneously stopping the flow of material being discharged through the tube.

The forming of the valve seat, the spring retention means and the spring clip locking groove may be accomplished by rolling with a suitable forming tool. For example, the tube 20 may be chucked and rotated about its axis, at which time a forming tool can simultaneously groove the end for locking the two tubes together as well as the second groove in from the discharge end of the tube. The valve biasing spring and the valve stem unit can then be inserted in the end of the tube, the spring compressed and the final groove formed to complete the valve assembly in the tube. Thus, there is provided a simple and easy method of forming and assembling a compact valve in the end of a discharge tube.

In operation, container 10 is partially filled with the material to be discharged. In a case where a two-component system is used (two compartments for keeping the ingredients separated until use), the desired material is first placed in the container and then the sac containing further ingredients is placed in the container, the marginal edge of the sac extending over the rim of the container. The cup-shaped cover is hermetically sealed to the edge of the container with the marginal edge of the sac therebetween to form two separate compartments. The cup-shaped cover has assembled thereon the dispensing head 26 and the telescoping tube arrangement heretofore described in detail. The cap 25 is unscrewed to permit the valve stem to be depressed, at which time the container is pressurized with a gas to about 40 or about 50 p.s.i. and the valve stem allowed to be urged in seating engagement by the valve spring to seal the gas therein. The cap 25 can then be screwed down to prevent accidental discharge of the contents of the container.

The container in this condition may be stored until use is desired, whereby unscrewing of the cap, extending the tube (in the telescoping type), and rupturing the sac readies the container for use. Pressing the valve instantaneously releases the material from the container as desired.

It will be appreciated that the valve seating groove and the other grooves may be preformed to any desired contour to accomplish the required function, and they will reflect the reverse of the tool's contour. Also, the distance between the valve seat groove and the spring anchoring groove may be varied to accommodate the desired length and tension producing characteristic of the spring used. It will be understood also that the means for unseating the valve by depressing of the valve stem may be in the form of a lever, button, or conventional type of motion producing apparatus which will transmit a component of force either downwardly or upwardly to the valve shaft as required by the particular valve construction.

It will be appreciated that the simplified valve construction of the invention may be arranged in any portion of the tube and that the valve seat may be of any desired angle or construction, rolled, impress-formed, etc., therein, which will provide the required valve seating surface, and that the anchoring means for the valve biasing spring may be above or below the valve seat as shown and described, or it may be positioned outside of the tube.

Although the present invention has been described with particularity with reference to preferred embodiments, it will be appreciated, after understanding the invention, that various changes and modification may be made therein without departing from the spirit and scope of the invention.

What is claimed is:

1. A pressurized dispensing device for maintaining ingredients which are incompatible during storage separate until use is desired comprising a pressure container having a centrally disposed opening in the top thereof; a pliant sac located in said container, said sac separating the container into sealed compartments; telescopically arranged discharge tubes, one tube slidably mounted in said centrally disposed opening in the top of said container and the other tube in the container with one end thereof above said pliant sac and the other end thereof adjacent to the top of said container; a valve device for dispensing the contents of the pressurized container having an annular seat positioned on the inside of said telescoping tube slidably mounted in the top of said container, said valve seat being an indentation of the tube wall; a valve stem seating means operatively positioned within said tube and contoured to engage said valve seat in sealed engagement therewith; projection indentation means formed from the wall of said tube, said indentation means spaced from said valve seat; biasing means positioned in said tube between said indentation means and said valve seat for urging said valve stem seating means in sealed engagement with said valve seat; detent means for locking said telescoping tubes in extended position when said slidably mounted tube is extended above said container; and means operatively connected to said valve stem means for actuation thereof to disengage the seating means from said valve seat to discharge the contents from said container when the locked extended telescoping tubes are depressed to rupture said sac and to lock said valve in seating engagement when said valve is not in use.

2. A pressurized compartmented container for maintaining ingredients which are incompatible during storage separate until use is desired comprising an upper and a lower chamber separated by a partition; a top for the upper compartment of the container sealed in position; a tube slidably mounted in a sealed opening in said top of said tube when in its upper position having its lower end extending to a plane above said partition; said tube being provided with a valve seat, a valve stem, and means for biasing the valve stem into closed position by engaging the valve seat; operating means extending outwardly beyond the tube adapted to unseat the valve stem to thereby open the interior of the tube to the exterior of the container; means by which the tube may be forced downwardly into the container to rupture the partition and to thereby cause communication between the compartments with the result that upon the movement of the operating means to unseat the valve stem, the contents are permitted to flow from the interior of the container through the tube to the exterior thereof.

3. A pressurized compartmented container for maintaining ingredients which are incompatible during storage separate until use is desired comprising upper and lower chambers separated by a partition; a top for the upper compartment of the container sealed in position; a tube slidably mounted in a sealed opening in said top extending when in its lowermost position to a plane above said partition; said tube being provided with a valve seat, a valve stem, and means for biasing the valve stem into closed position by engaging the valve seat; operating means extending outwardly beyond the tube adapted to unseat the valve stem to thereby open the interior of the tube to the exterior of the container; a second tube telescopically mounted on said first tube, said second tube being retained within the compartment above the partition, whereby movement of the inner tube upwardly results in effective elongation of the length of the telescoping tubes whereby when the inner tube is forced downwardly into the container the outer tube carried therewith dislodges the partition to cause communication between the compartments; with the result that the movement of the operating means to unseat the valve stem will permit the flow of the contents from the interior of the container through the two tubes to the exterior thereof.

References Cited in the file of this patent
UNITED STATES PATENTS

| | | |
|---|---|---|
| 313,077 | Hudson | Mar. 3, 1885 |
| 1,106,327 | Areson | Aug. 4, 1914 |
| 1,324,206 | Nickel | Dec. 9, 1919 |
| 2,091,737 | Longway | Aug. 31, 1937 |
| 2,139,097 | Piquerez | Dec. 6, 1938 |
| 2,359,534 | Slatnick | Oct. 3, 1944 |
| 2,550,840 | Martin et al. | May 1, 1951 |
| 2,613,016 | Jarrett et al. | Oct. 7, 1952 |
| 2,755,973 | Campbell | July 24, 1956 |
| 2,878,965 | Hirt et al. | Mar. 24, 1957 |